Figure 1:
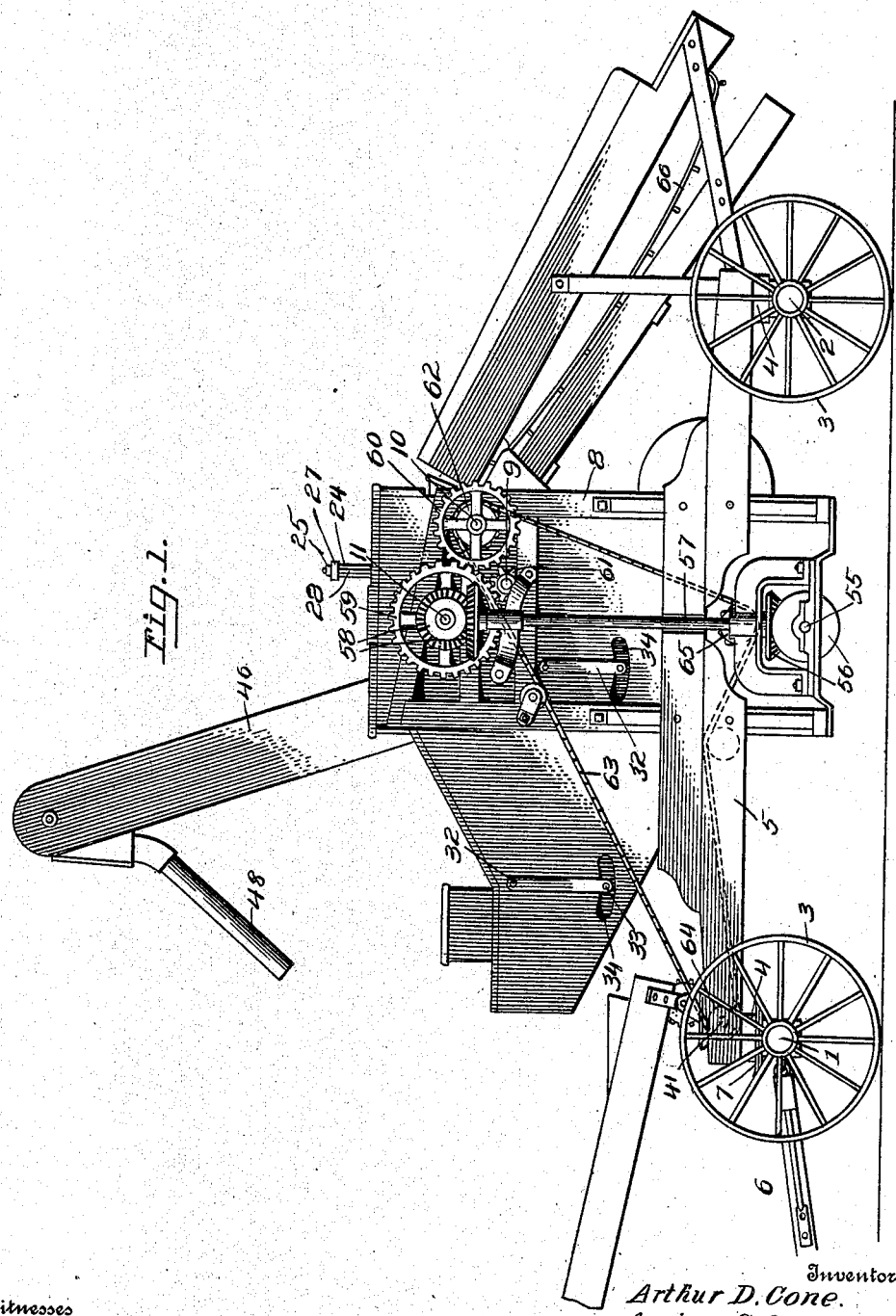

No. 885,665. PATENTED APR. 21, 1908.
A. D. & A. C. CONE.
CORN SHELLER MACHINE.
APPLICATION FILED JULY 31, 1907.

3 SHEETS—SHEET 1.

Witnesses
F. C. Gibson.
Wm. Bagger.

Inventors
Arthur D. Cone.
Arvine C. Cone.

By Victor J. Evans
Attorney

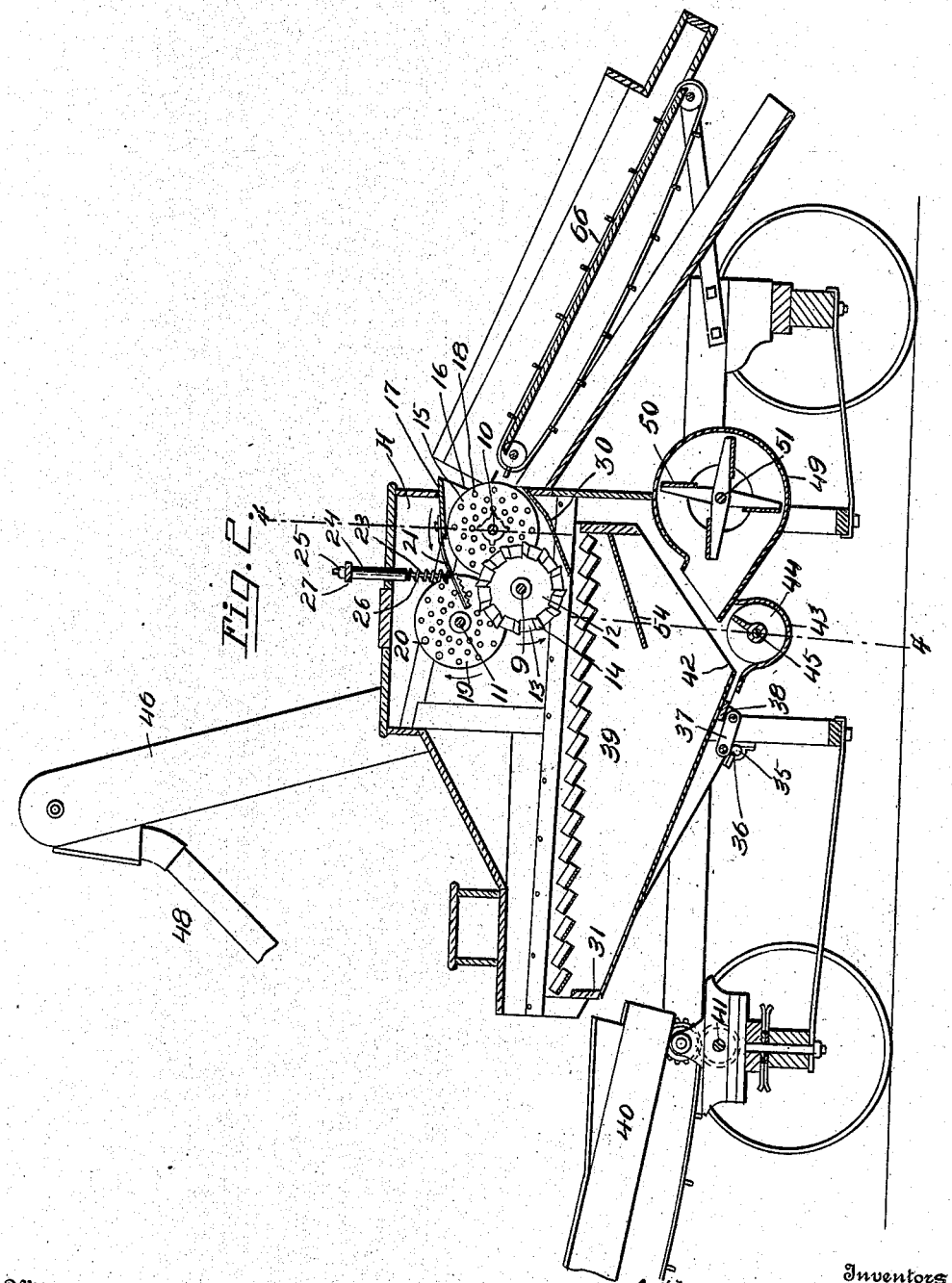

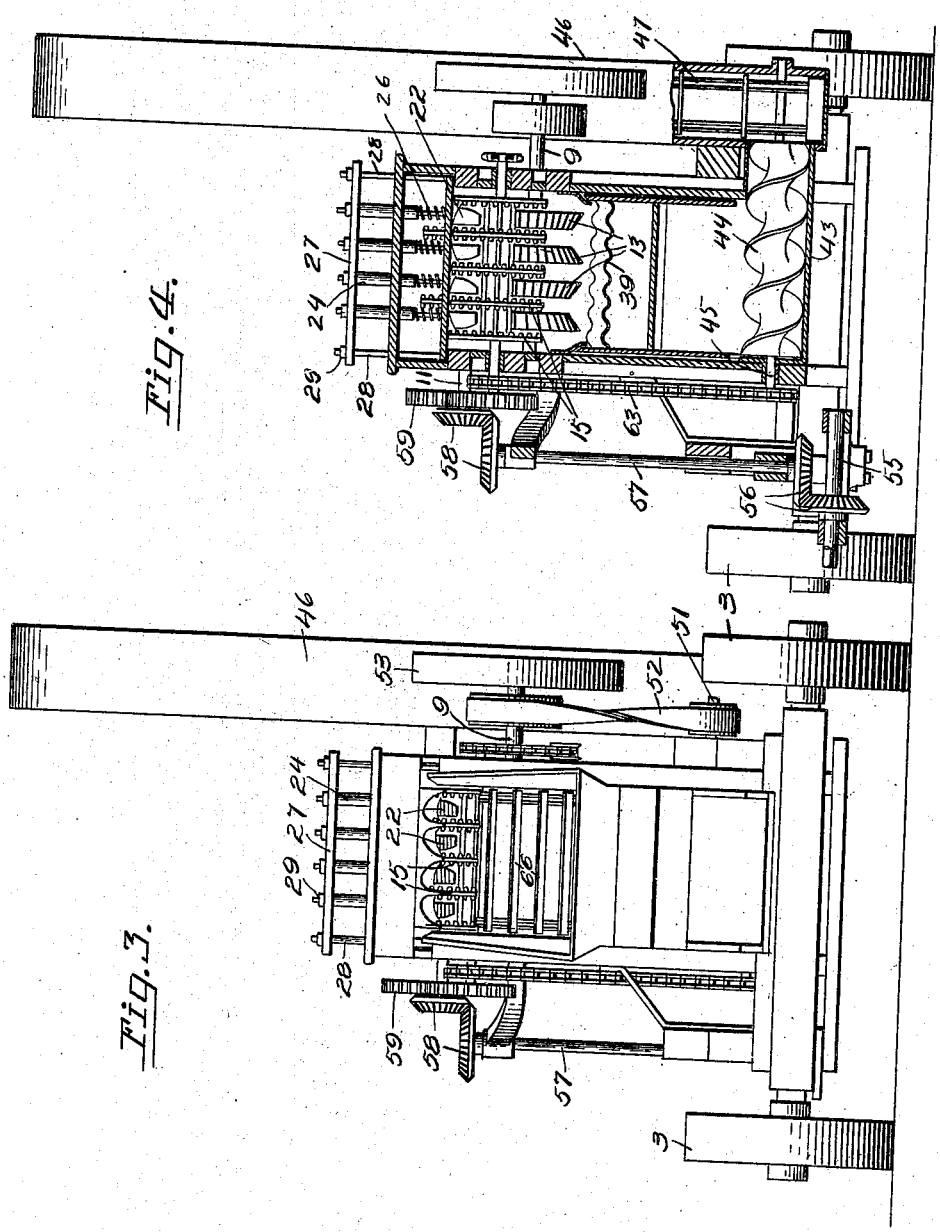

UNITED STATES PATENT OFFICE.

ARTHUR D. CONE AND ARVINE C. CONE, OF ANSLEY, NEBRASKA.

CORN-SHELLER MACHINE.

No. 885,665.      Specification of Letters Patent.      Patented April 21, 1908.

Application filed July 31, 1907. Serial No. 386,405.

*To all whom it may concern:*

Be it known that we, ARTHUR D. CONE and ARVINE C. CONE, citizens of the United States, residing at Ansley, in the county of Custer and State of Nebraska, have invented new and useful Improvements in Corn-Sheller Machines, of which the following is a specification.

This invention relates to corn shellers, and it has for its objects to simplify and improve the construction and operation of this class of machines.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawings, Figure 1 is a side elevation of a corn sheller constructed in accordance with the invention. Fig. 2 is a longitudinal sectional view of the same. Fig. 3 is a rear end elevation. Fig. 4 is a transverse sectional view taken on the plane indicated by the line 4—4 in Fig. 2.

Corresponding parts in the several figures are denoted by like characters of reference.

The improved corn shelling machine is mounted upon a running gear including front and rear axles 1—2 having the transporting and carrying wheels 3—3 and supporting, upon the usual bolsters 4—4 a horizontally disposed frame 5; the front axle has a tongue 6 suitably connected therewith for the attachment of the draft, and a fixed wheel 7 is interposed between the front axle and bolster to enable turns to be made when the machine is being transported from one place to another.

The casing 8 of the machine, which is supported upon the frame 5 may be of any appropriate shape and construction, and said casing includes the hopper H wherein shafts 9, 10 and 11, are transversely disposed and supported for rotation in suitable bearings. The shaft 9, which is disposed in the lower part of the hopper carries a plurality of pairs of concaves consisting of disks 12 having oppositely disposed inclined or beveled flanges 13 equipped with teeth or serrations 14 which coöperate with the sheller disks to detach the seeds or kernels from the cobs of the ears of corn fed to the machine through the mouth of the hopper. The sheller disks 15 are supported or mounted upon the shaft 10 which is located above the shaft 9, intermediate the latter and the mouth 16 of the hopper; the latter being provided with a hood 17 extending above the sheller disks, which latter are provided with laterally extending pins or pegs 18. Said sheller disks are disposed between and adjacent to the concave faces, as will be best seen by reference to Fig. 4 of the drawings. The shaft 11, which is disposed above the shaft 9 and in rear of the latter, the mouth or entrance opening 16 being regarded as located at the front end of the hopper although facing rearwardly with regard to the frame of the machine, carries the beater disks 19 one of which is located intermediate each pair of concave disks; said beater disks being provided with laterally extending pins or pegs 20.

Secured upon the hood 17, and extending rearwardly from the latter above and in alinement with the flanges 13 of the concaves, are the presser springs 21 having terminal jaws 22, the undersides of which are transversely toothed or serrated; suitably connected to said presser springs are guide rods 23 that extend upwardly through tubular housings 24 sliding in the top of the casing and are provided with adjusting nuts 25 for the purpose of regulating the tension springs 26 which are coiled upon the guide rods 23, and which bear against the lower ends of the housings; the object of said tension springs being to regulate the pressure of the springs 21. The guide rods 23 are connected in series by a cross-bar 27 arranged above the housings 24 and beneath the adjusting nuts 25, said cross-bar being adjustable upon rods or bolts 28 connected with the sides of the casing and equipped with adjusting nuts 29. By manipulating the latter, the entire set of presser springs, which are individually adjustable by the nuts 25, may be simultaneously adjusted to regulate the pressure thereof, thus simplifying and greatly facilitating the adjustment.

An apron or deflector 30 extends from the lower part of the mouth of the hopper rearwardly into the latter, beneath the sheller disks and the concaves, for the purpose of guiding or conveying the shelled corn to the separator which includes a shoe 31 supported for vibration by means of links 32 which are pivoted upon the sides of the casing and are connected with the shoe by means of the pins or trunnions 33 that extend through arcuate slots 34 in the sides of the casing. The shoe is operated by means of a shaft 35 supported for rotation in suitable bearings upon the casing and having a crank 36 which is connected by means of a link 37 with a lug 38 upon the underside of the shoe. The latter carries a screen or riddle 39 constructed of corrugated sheet metal in such a manner that while the shelled corn will pass through said screen into the shoe, the cobs, by the reciprocatory movement of the shoe will be gradually projected or propelled in a rearward direction, and finally discharged over the tail end of the casing onto the cob carrier or stacker 40, the latter being driven, through the medium of suitable intermediate mechanism of well known construction, from a shaft 41, the means of driving which will be presently described.

The shoe 31 has a discharge opening 42 through which the shelled corn is discharged into a casing 43 containing a spiral conveyer 44 mounted upon a shaft 45, and discharging at one end into the elevator casing 46, the lower end of which affords a bearing for one end of the shaft 45, and which serves to impart motion to the endless conveyer 47 of the elevator whereby the shelled corn is elevated and discharged into the conveyer spout 48. The conveyer casing 43 is disposed adjacent to a casing 49 containing the fan 50 which is mounted upon a shaft 51, which is driven by means of a twisted belt 52 from the shaft 9, which, in addition to the concave disks 12 carries a drive wheel 53. A deflector 54 is suitably arranged within the shoe 31 above the mouth or discharge opening of the fan casing 49.

Motion is transmitted to the machine from any suitable source of power through the medium of a tumbler shaft 55 connected by bevel gearing 56 with a vertically disposed transmission shaft 57 from which motion is transmitted by bevel gearing 58 to the beater shaft 11. The latter is provided with a gear wheel 59 meshing with pinions 60 and 61 upon the shafts 10 and 9 respectively; the pinion 61, especially, being of small dimensions so that the shaft 9 will be driven at relatively high speed, as is obviously desirable. The shaft 10 carries a sprocket wheel 62 over which passes a chain 63 that serves to transmit motion, by means of sprocket wheels 64, 65, respectively to the shaft 41 from which motion is transmitted to the cob carrier, and to the shaft 45 carrying the spiral conveyer 44.

The corn that is to be shelled is fed to the machine by a conveyer 66 to which motion may be imparted by any suitable means, not shown.

Having thus fully described the invention, what is claimed as new is:—

1. In a corn shelling machine, a casing having a feed opening, a shaft supported in said casing for rotation at high speed, disks mounted in pairs and having oppositely inclined serrated flanges, sheller disks and beater disks supported for rotation in coöperation with the flanged disks, presser springs secured adjacent the feed opening and having terminal shoes, said shoes being transversely toothed on the under side thereof, guide rods connected with the springs, housing and adjusting springs upon the guide rods, a suitably supported cross bar connecting the guide rods in series, tightening nuts upon the guide rods adjacent to the cross bar and bolts connected with the sides of the casing and equipped with adjusting nuts for simultaneously regulating the pressure of the said presser springs.

2. In a corn shelling machine, in combination of a casing including a hopper having a feed opening, a shaft supported for rotation at high speed, disks mounted in pairs upon said shaft and having oppositely inclined serrated flanges, sheller disks and beater disks supported for rotation in coöperation with the flanged disks, presser springs having terminal flanged shoes, guide rods connected with the springs, housings and adjusting springs upon the guide rods, a suitably supported cross bar connecting the guide rods in series, tightening nuts upon the guide rods adjacent to the cross bar, and adjusting means for the latter, with a separator comprising a shoe, links connecting said shoe to the casing, a discharge opening in the bottom of the casing, a casing beneath said opening, a spiral conveyer mounted upon a shaft and supported in said casing, said conveyer discharging at one end into an elevator casing, the lower end of the latter serving as a bearing for the shaft carrying the spiral conveyer, and an endless belt in said elevator casing for elevating and discharging the corn.

In testimony whereof we affix our signatures in presence of two witnesses.

ARTHUR D. CONE.
ARVINE C. CONE.

Witnesses to signature of Arthur D. Cone:
  GEO. E. RUHRMYER,
  GEO. WRIGHT.

Witnesses to the signature of Arvine C. Cone:
  H. H. COMPTON,
  J. M. GOOD.